Figure 1:
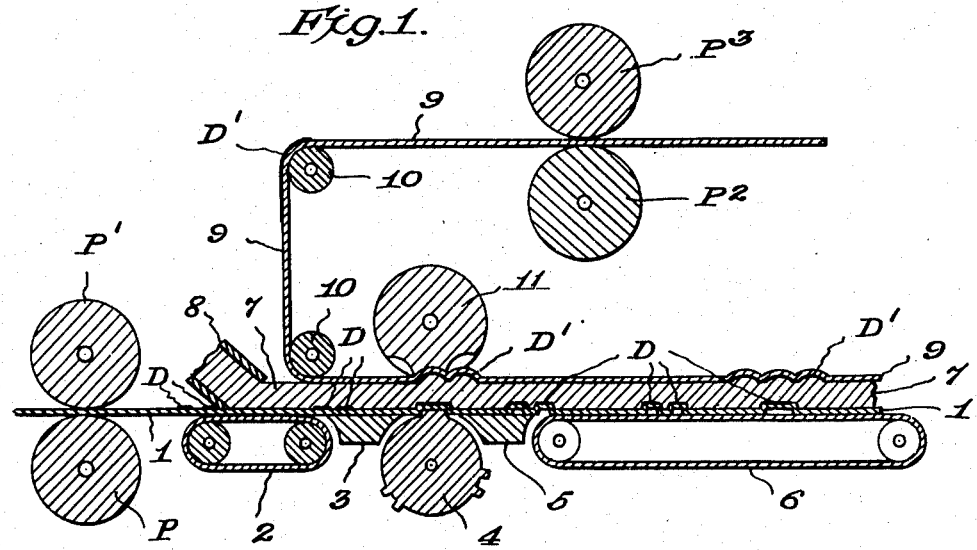

July 26, 1949.  E. KARFIOL ET AL  2,477,300
DECORATIVE SHELF EDGING
Filed May 12, 1945

INVENTORS
EDWARD KARFIOL &
WILLIAM A. ROEHM
BY Cornelius Zabriskie
ATTORNEY

Patented July 26, 1949

2,477,300

UNITED STATES PATENT OFFICE 2,477,300

DECORATIVE SHELF EDGING

Edward Karfiol, Great Neck, and William A. Roehm, Rockville Centre, N. Y., assignors, by mesne assignments, to Virtu, Inc., Brooklyn, N. Y., a corporation of New York Application May 12, 1945, Serial No. 593,450

5 Claims. (Cl. 154—47)

This invention relates to shelf edgings, shelf coverings and other ornamental articles and is particularly directed to a novel form of shelf edging and a novel method of producing the same.

In one form of the invention, backing stock, which may be of paper or of other opaque material or of a transparent plastic, is first printed in one or more colors with a predetermined design. On this backing stock is then deposited a layer of transparent plastic material with the printed face of the backing stock in contact with the plastic layer. At the same time there is laid upon the opposite face of the plastic layer a facing ply which has been previously printed with an appropriate predetermined design in one or more colors, so that the printing on the facing ply will lie between said ply and the plastic layer. The resulting laminated structure is then subjected to the actions of an embossing roll and an impressing roll, the former of which manipulates the facing ply, the printed design thereon and the plastic layer into embossed bas-relief. The impressing roll, either simultaneously with the operation of the embossed roll or before or after the same, serves to impress the printed design on the backing ply into the contiguous face of the plastic layer. A laminated structure is thus provided, wherein the backing ply and the facing ply carry respectively, impressed and embossed designs spaced from one another by a part of the thickness of the interposed plastic ply, but properly co-related so that they are collectively visible through the transparent facing ply and the transparent plastic layer, to give remarkably novel and pleasing optical effects. Both of the facing ply and the plastic layer should be transparent, while the backing ply may be opaque.

The operations described will be continually carried out in a rapid, efficient and economical manner. The end product has considerable merit when used as a shelf edging or for other decoration.

Features of the invention other than those adverted to will be apparent from the hereinafter detailed description when read in conjunction with the accompanying drawings.

The drawings show one practical form of the article of this invention and one method of making the same, but the showing therein made is illustrative only, and does not define the limits of the invention.

In the drawings:

Figure 1 diagrammatically shows one manner of practicing the method of this invention. This view shows the end product in central section on the line 1—1 of Figure 2.

Figure 2:
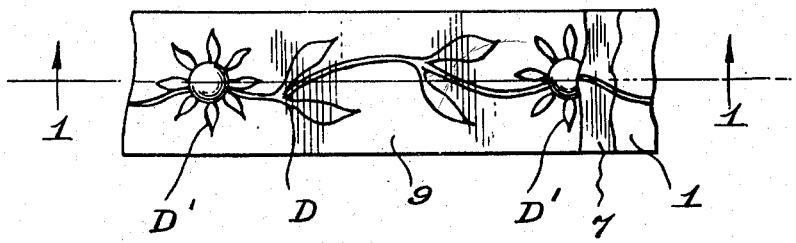

Figure 2 is a face view of the article of Figure 1.

In the showing of Figure 1, backing stock, in the form of a web 1, is fed between printing rolls P—P', which print a design D upon the upper surface of the web in one or more colors and then pass said web to a conveyor 2. From the conveyor, said web passes in succession across a fixed table 3, an impressing roll 4, a fixed table 5 and a conveyor 6, to the discharge end of the apparatus.

While traveling with the conveyor 2, there is deposited upon the upper printed surface of the web 1, a plastic layer 7 by any suitable means such as extruder 8. The plastic layer 7 travels along with the backing web 1 and as it moves, there is laid upon its proper surface a facing web 9. This web is passed from any suitable source, between the printing rolls $P^2$, $P^3$ which print a design D' upon the surface of the web and from these printing rolls the web passes about directional rolls 10, to be laid upon the upper surface of the plastic layer as stated.

After thus being laminated, the facing and backing plies and the interposed plastic layer move into cooperative relation with an embossing roll 11 and an indenting roll 4. These rolls 4 and 11 are so synchronized and driven that they will respectively indent and emboss in registration with the printed designs D and D' on the respective plies. That is to say, the indenting roll 4 will indent or force those portions of the backing ply which carry the printed design D, into the contiguous face of the plastic layer, while the embossing roll 11 will bear upon the opposite surface of the facing ply with sufficient force to flow the plastic layer and effectively emboss the printed design thereon, causing said printed design D' to protrude outwardly from the major portion of the outer face of the facing ply, as clearly indicated in Figure 1.

The laminated structure is thus manipulated while the plastic layer is in a semi-liquid or semi-solid state so that it may be flowed in a manner specified without being mobile under the force of gravity. The rolls 4 and 11 may be heated if desired to facilitate this operation. In some cases and with particular plastics, the heat of the rolls per se will be sufficient to accomplish the results stated.

In any event the laminated structure will leave the rolls 4 and 11 with the facing ply and a contiguous face of the plastic layer embossed in registration with the design on such ply and with the design on the backing ply impressed into the contiguous face of the plastic layer. The resulting structure will "set" after leaving the rolls 4 and 11 and, if desired, suitable cooling means may be provided to facilitate this operation so that the resulting end product article will appear as shown at the right of the rolls 4 and 11 of Figure 1 and in face view as shown in Figure 2.

For the purpose of illustration, the facing ply as shown has a printed design D' simulating flower repeats, while the backing ply has a printed design D forming a running vine and leaf design. In the finished article, as shown in Figure 2, the flower repeats D' will stand out in bas-relief, while the running vine design D will underlie the flower design in spaced relation thereto, but so proportioned as to be co-related therewith. With this arrangement very effective results are obtained from the optical standpoint, although it should be understood that the designs to which we have referred, need not be floral designs or a running vine design as shown, but may be varied according to taste.

The plastic employed for the plastic layer and for either or both the facing and backing plies may be any one or more of a wide variety of plastics, but are preferably of the thermoplastic or thermosetting types. If a thermoplastic type of plastic is used, the conveyor 2, table 3 and the embossing and impressing rolls are preferably heated to facilitate manipulation of the plastic. If a thermosetting type of plastic is used, appropriate heating means may be added beyond the rolls to facilitate quick setting and thus speed up production. Transparent synthetic resins are preferably used in the forming of the plastic layer, such as cellulose acetate, cellulose acetate butyrate, acrylic resins, stearine resins, vinyl resins, urea resins, phenolic resins, etc. In some cases, cellulosic materials may be used, particularly in the formation of the facing ply or backing ply.

In the accompanying drawings, the roll 11 is shown as an embossing roll so that the facing ply and the contiguous portion of the plastic layer are embossed in registration with the design D' to protrude outwardly from the major portion of the face of said plastic ply. However, the embossing roll 11 may be replaced by an impressing roll, i. e. a roll having projections, to function after the manner of the roll 4 so that the facing ply and the contiguous face of the plastic ply are indented in registration with the printed design D', to emboss said design into the plastic layer.

Thus, in one form of this invention, there is a printed design, positioned between the facing ply and the plastic ply and embossed into the facing ply, and another printed design between the backing ply and the plastic ply and embossed into the plastic ply. In the other form, the two designs are placed between the corresponding plies but both designs are embossed into the plastic ply.

The word "embossed" as used herein to define condition or physical state, signifies protuberance of the part or parts thus referred to. When used to denote action, said word signifies the operation of producing a protuberant condition.

In a preferred manner of carrying out the method of this invention it is practiced as a continuous operation by means of printing rolls and embossing and impressing rolls. In practice, however, it is entirely feasible, although slower and less adapted for quantity production, to carry out the steps referred to by means of flat plate operations.

The foregoing detailed description sets forth the invention in a preferred practical form but the invention is to be understood as fully commensurate with the appended claims.

Having thus fully described our invention, what we claim is new and desired to secure by Letters Patent is:

1. An article of the character described comprising: a transparent plastic ply, a transparent facing ply in face abutting relation to the front face of the plastic ply, a backing ply in face abutting relation to the back face of the plastic ply, a printed design between the facing and plastic plies and embossed into one of them, and a printed design between the backing and plastic plies and embossed into one of them, whereby said designs are spaced from one another in the direction of the thickness of said article by at least a part of the thickness of the plastic ply.

2. An article of the character described comprising: a transparent plastic ply, one face of which is embossed to provide protruding portions projecting outwardly from the major portion of said face, a transparent ply of material overlying and conforming to the embossed face of the plastic ply and carrying a printed design at least a portion of which registers with the embossing of the plastic ply, and a backing ply in face abutting relation with the back surface of the plastic ply and carrying a printed design at least a portion of which is impressed into the contiguous face of the plastic ply.

3. An article of the character described comprising: a transparent plastic ply the front and back faces of which are provided with depressions corresponding to predetermined designs, a transparent facing ply in face abutting relation to the front face of the plastic ply and carrying a printed design embossed into the depressions in the front face of the plastic ply, and a backing ply in face abutting relation to the back face of the plastic ply and carrying a printed design embossed into the depressions in the back face of the plastic ply.

4. An article of the character described comprising: a transparent organic plastic ply interposed between a transparent facing ply and a back ply with a printed design between each two adjacent plies, said printed designs being co-related to collectively form a composite design, and the contiguous faces of at least two adjacent plies and at least a portion of the design which is positioned between them being distorted out of the common plane of said faces.

5. An article of the character described comprising: a transparent organic plastic ply interposed between a transparent facing ply and a back ply with a printed design between each two adjacent plies, said printed designs being co-related to collectively form a composite design, and the contiguous faces of each two adjacent plies and at least a portion of the designs between them being distorted out of the common planes between said adjacent plies.

EDWARD KARFIOL.
WILLIAM A. ROEHM.

REFERENCES CITED

The following references are of record in the file of this patent:

UNITED STATES PATENTS

| Number | Name | Date |
|---|---|---|
| 440,055 | Palmer | Nov. 4, 1890 |
| 1,741,683 | Dickey | Dec. 31, 1929 |
| 1,985,480 | Carpenter | Dec. 25, 1934 |
| 2,143,141 | Cooley | Jan. 10, 1939 |
| 2,273,568 | Fishel | Feb. 17, 1942 |
| 2,311,156 | Casto | Feb. 16, 1943 |
| 2,392,594 | Karfiol et al. | Jan. 8, 1946 |